US012102267B2

(12) United States Patent
Klein et al.

(10) Patent No.: US 12,102,267 B2
(45) Date of Patent: Oct. 1, 2024

(54) MODULAR SYSTEM FOR AUTONOMOUS FOOD ASSEMBLY

(71) Applicant: Hyphen Technologies, Inc., San Jose, CA (US)

(72) Inventors: Stephen Klein, San Jose, CA (US); Daniel Fukuba, San Jose, CA (US); Eric Vicenti, San Jose, CA (US)

(73) Assignee: Hyphen Technologies, Inc., San Jose, CA (US)

( * ) Notice: Subject to any disclaimer, the term of this patent is extended or adjusted under 35 U.S.C. 154(b) by 0 days.

(21) Appl. No.: 18/207,558

(22) Filed: Jun. 8, 2023

(65) Prior Publication Data

US 2023/0309755 A1 Oct. 5, 2023

Related U.S. Application Data

(63) Continuation of application No. 16/666,882, filed on Oct. 29, 2019.

(Continued)

(51) Int. Cl.
*A47F 1/04* (2006.01)
*A23L 19/00* (2016.01)
(Continued)

(52) U.S. Cl.
CPC .............. *A47J 44/00* (2013.01); *A23L 19/03* (2016.08); *A23L 19/09* (2016.08); *A47F 1/04* (2013.01);
(Continued)

(58) Field of Classification Search
CPC ..... A23L 19/03; A23L 19/09; A23V 2002/00; A47F 1/04; A47F 3/04; A47F 5/108; A47F 10/02; A47F 10/06; A47J 43/04; A47J 44/00; A47J 44/02; A47J 2201/00; B60P 3/0257; B60P 3/20; B62D 63/025; G05D 1/0088; G07F 17/0064; H02J 3/32
(Continued)

(56) References Cited

U.S. PATENT DOCUMENTS 2,733,094 A * 1/1956 Carlton ..................... A47F 1/04
296/22
7,364,050 B2 * 4/2008 Guard ................... B60P 3/0257
296/22

(Continued)

*Primary Examiner* — Joshua E Rodden
(74) *Attorney, Agent, or Firm* — Run8 Patent Group, LLC; Peter Miller; Leah Raddatz

(57) ABSTRACT

A modular system for autonomous food assembly includes: a skid operable in a first configuration configured to transiently install on a vehicle and in a second configuration configured to transiently install in a kiosk; a set of food dispensing modules configured to transiently install on the skid and store and dispense food based on food orders; and a fixed infrastructure configured to distribute power from a first power source in the truck to the set of food dispensing modules in the first configuration, from a second power source in the fixed kiosk to the set of food dispensing modules in the second configuration, and to the set of food dispensing modules; a controller installed on the skid and configured to receive food orders and control the set of food dispensing modules to dispense food orders from the truck in the first configuration and from the kiosk in the second configuration.

7 Claims, 6 Drawing Sheets

Related U.S. Application Data

(60) Provisional application No. 62/752,179, filed on Oct. 29, 2018.

(51) Int. Cl.

| | | |
|---|---|---|
| *A47F 3/04* | (2006.01) | |
| *A47F 5/10* | (2006.01) | |
| *A47F 10/02* | (2006.01) | |
| *A47F 10/06* | (2006.01) | |
| *A47J 43/04* | (2006.01) | |
| *A47J 44/00* | (2006.01) | |
| *B60P 3/025* | (2006.01) | |
| *B60P 3/20* | (2006.01) | |
| *H02J 3/32* | (2006.01) | |
| *G05D 1/00* | (2006.01) | |

(52) U.S. Cl.
CPC ............... *A47F 3/04* (2013.01); *A47F 5/108* (2013.01); *A47F 10/02* (2013.01); *A47F 10/06* (2013.01); *A47J 43/04* (2013.01); *B60P 3/0257* (2013.01); *B60P 3/20* (2013.01); *H02J 3/32* (2013.01); *A23V 2002/00* (2013.01); *A47J 2201/00* (2013.01); *G05D 1/0088* (2013.01)

(58) Field of Classification Search
USPC ...... 99/340, 357, 449, 483; 296/24.3, 24.33, 296/24.35, 24.36; 426/231, 232, 233
See application file for complete search history.

(56) References Cited

U.S. PATENT DOCUMENTS

| | | | |
|---|---|---|---|
| 9,127,872 B1* | 9/2015 | Chainey | F25D 11/003 |
| 9,266,077 B2* | 2/2016 | Bachman | B01F 33/805 |
| 9,321,387 B2* | 4/2016 | Lamb | B60P 3/0257 |
| 10,339,514 B2* | 7/2019 | Natarajan | G06Q 20/202 |
| 10,479,418 B1* | 11/2019 | Patel | B65D 90/0066 |
| 11,014,484 B1* | 5/2021 | Borden | B62D 39/00 |
| 11,049,197 B2* | 6/2021 | Ekin | G05D 1/0257 |
| 2008/0190917 A1* | 8/2008 | Frahm | B60P 7/13 108/55.5 |
| 2012/0298688 A1* | 11/2012 | Stiernagle | G06Q 20/18 221/155 |
| 2014/0255566 A1* | 9/2014 | Cuomo | G05D 21/02 99/486 |
| 2014/0370167 A1* | 12/2014 | Garden | G06Q 10/08355 99/325 |
| 2019/0050952 A1* | 2/2019 | Goldberg | A23L 5/15 |
| 2020/0200393 A1* | 6/2020 | Goldberg | F24C 7/088 |
| 2020/0251910 A1* | 8/2020 | Moorman | H02J 7/34 |
| 2021/0022559 A1* | 1/2021 | Zito | A47J 44/00 |
| 2021/0097481 A1* | 4/2021 | Salter | A61L 2/088 |
| 2021/0139094 A1* | 5/2021 | Matsutani | B60P 3/426 |
| 2021/0174311 A1* | 6/2021 | Yoshikawa | G07F 17/00 |
| 2021/0247766 A1* | 8/2021 | Yoshikawa | G05D 1/0212 |
| 2022/0108250 A1* | 4/2022 | Pietz | G05B 19/042 |
| 2022/0212736 A1* | 7/2022 | Bollinger | B62D 63/025 |

* cited by examiner ately install on various skids 110 over time or integrated into these
MODULAR SYSTEM FOR AUTONOMOUS FOOD ASSEMBLY

CROSS-REFERENCE TO RELATED APPLICATIONS

This Application is a continuation of U.S. patent application Ser. No. 16/666,882, filed on 29 Oct. 2019, which claims the benefit of U.S. Provisional Application No. 62/752,179, filed on 29 Oct. 2018, each of which is incorporated in its entirety by this reference.

TECHNICAL FIELD

This invention relates generally to the field of food production and more specifically to a new and useful modular system for autonomous food assembly in the field of food production.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
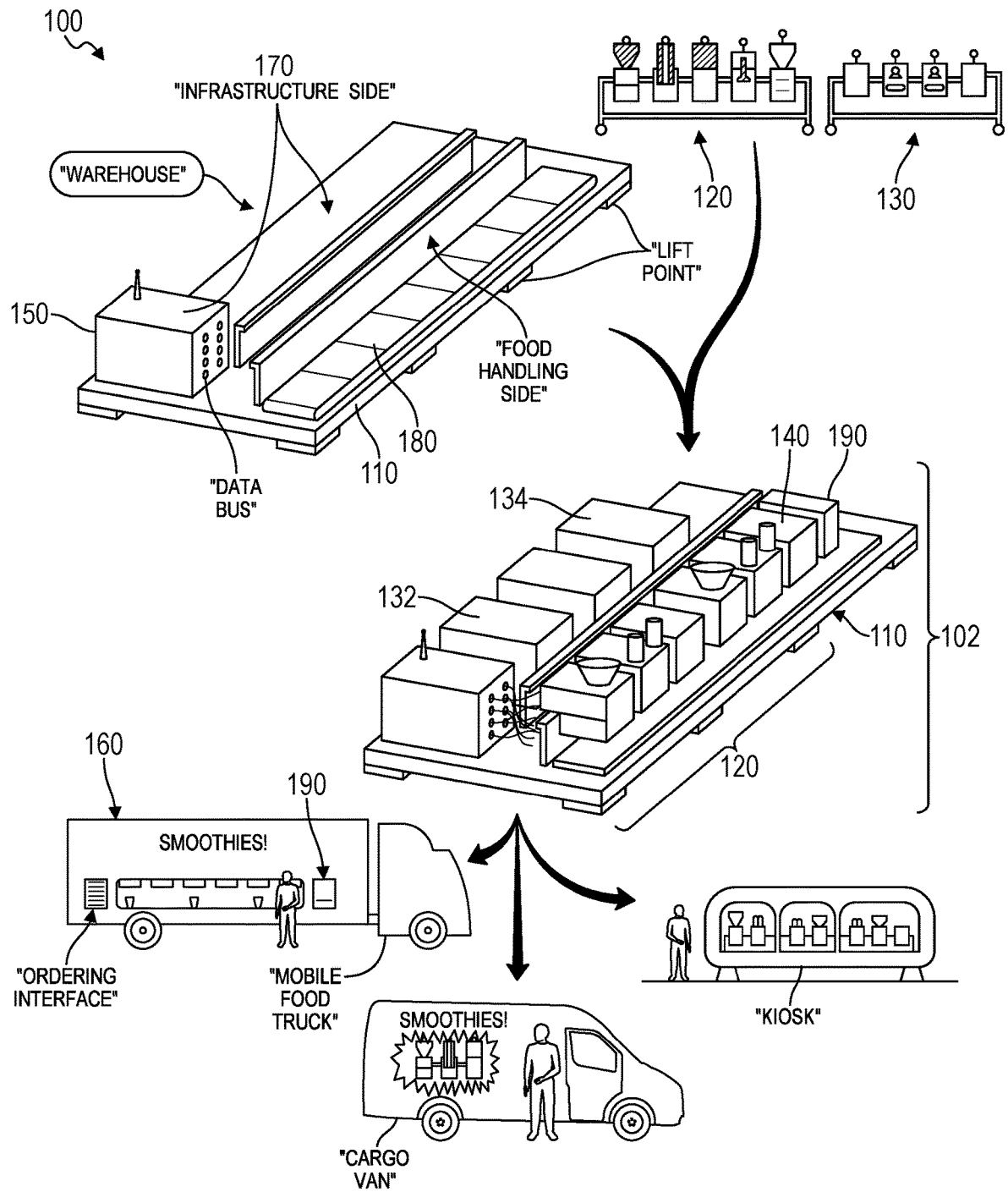
FIG. 1 is a flowchart representation of a system.
Figure 2:
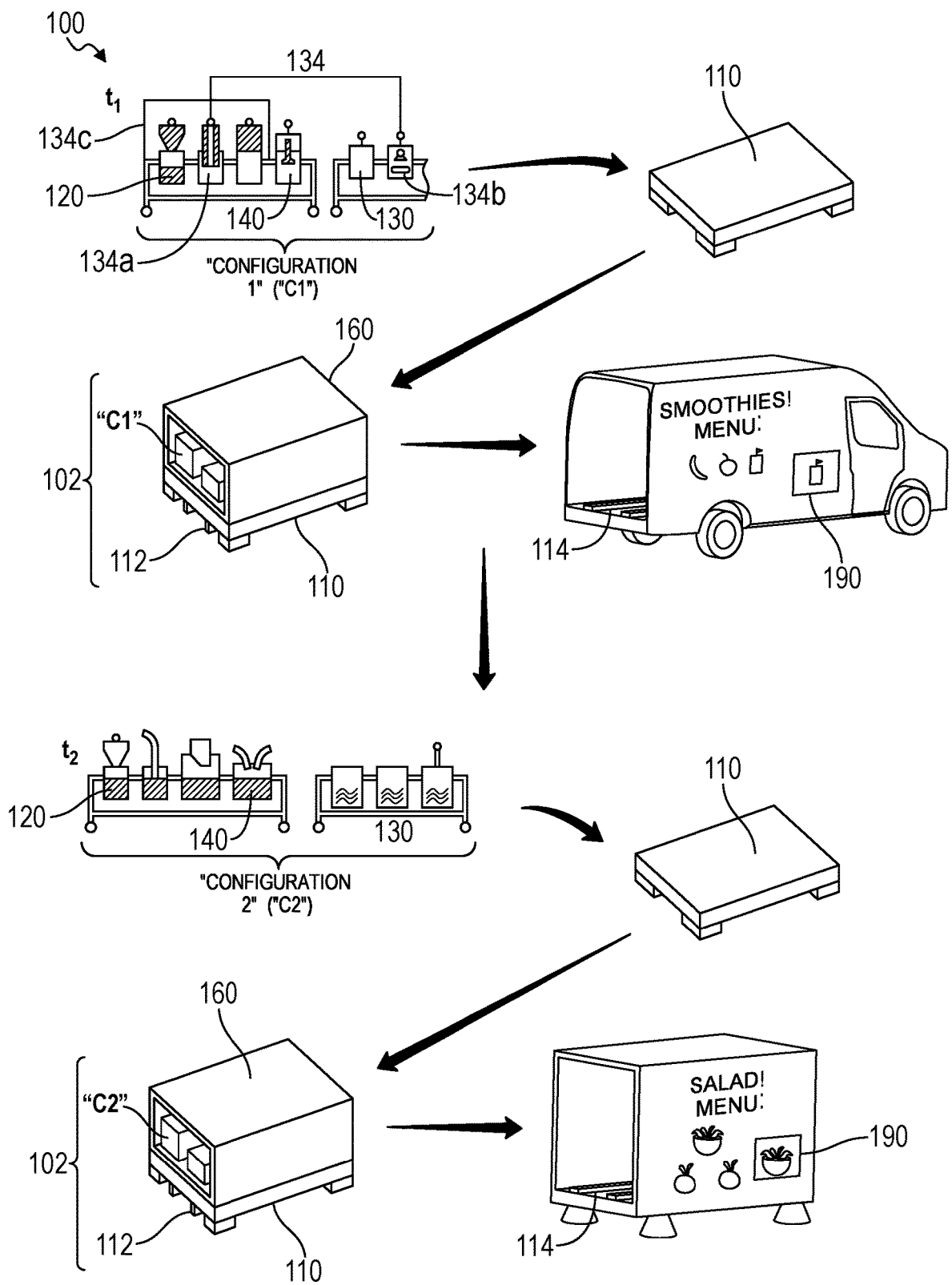
FIG. 2 is a schematic representation of one variation of the system.

As shown in FIGS. 1 and 2, a modular system 100 for autonomous food assembly includes: a skid 110 operable in a first configuration configured to transiently install on a road vehicle and operable in a second configuration configured to transiently install in a kiosk; a set of food dispensing modules 120 configured to transiently install on the skid no and store food and dispense food based on food orders; and a fixed infrastructure 170 configured to distribute power from a first power source in the truck to the set of food dispensing modules 120 in the first configuration, distribute power from a second power source in the fixed kiosk to the set of food dispensing modules in the second configuration, and distribute power to the set of food dispensing modules 120. The modular system 100 also includes a controller 150 installed on the skid no and configured to receive food orders and selectively control the set of food dispensing modules 120 to pair and dispense food orders from the truck in the first configuration, and from the fixed kiosk in the second configuration.

In one variation shown in FIG. 2, the system 100 includes: a skid 110 operable in a first configuration to support (or "house," "locate," "accommodate") a first set of modules and operable in a second configuration to support a second set of modules; a set of food dispensing modules 120, each food dispensing module 120 configured to transiently install on the skid 110, and dispense a volume of an ingredient based on food orders; a set of food processing modules 140, each food processing module 140 configured to transiently install on the skid 110, and modify ingredients dispensed from food dispensing modules 120; a set of power modules 132 configured to transiently install on the skid 110, each power module 132 including a power source unique to the set; a controller 150 installed on the skid 110 and configured to receive food orders and selectively control the set of food dispensing modules 120 to pair and dispense food orders in the first configuration and the second configuration.

Figure 7:
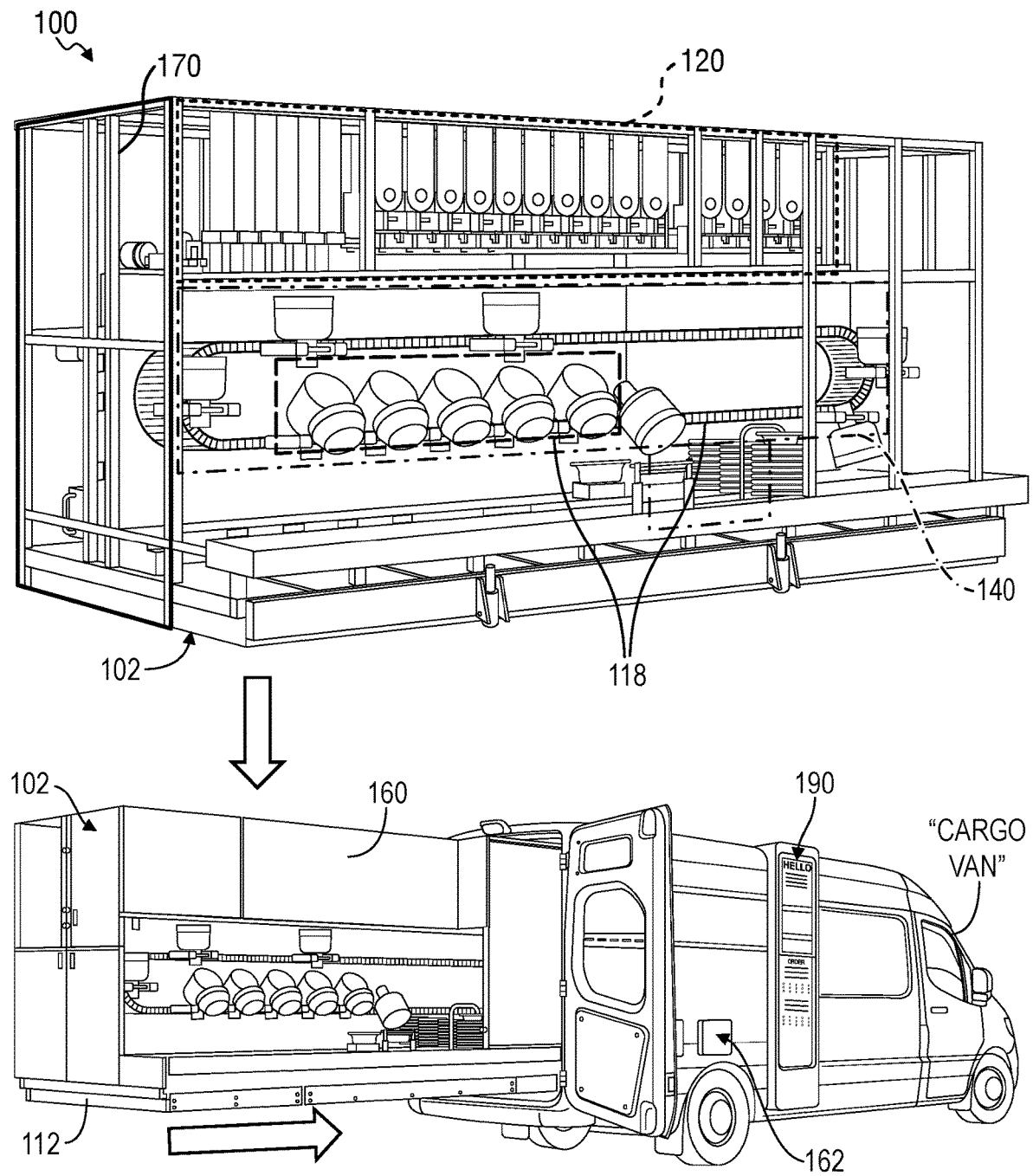
FIG. 7 is a flowchart representation of one variation of the system.

As shown in FIGS. 1 and 7, another variation of the system 100 includes: a skid 110 configured to transiently load onto a road vehicle, configured to transiently install in a kiosk, and including a conveyor 180; a set of power modules 132 configured to transiently install on the skid 110, each power module 132 including a power source unique to the set; a set of food dispensing modules 120, each food dispensing module 120 configured to transiently install on the skid 110 proximal the conveyor 180 and configured to dispense a volume of an ingredient toward the conveyor 180; and a set of food processing modules 140, each food processing module 140 configured to transiently install on the skid 110 proximal the conveyor 180 and configured to modify ingredients dispensed from food dispensing modules 120 onto the conveyor 180. The system 100 also includes a controller 150: installed in the skid 110; configured to selectively trigger food dispensing modules 120, in a subset of the set of food dispensing modules 120 transiently installed on the skid no, to dispense volumes of corresponding ingredients; and configured to selectively trigger food processing modules 140, in a subset of the set of food processing modules 140 transiently installed on the skid no, to modify volumes of ingredients carried by the conveyor 180 to form units of a particular food product type associated with the subset of the set of food dispensing modules 120 and the subset of the set of food processing modules 140.

2. Applications

Generally, the system 100 includes: a population of skids no that form transportable, reconfigurable chassis for on-demand food production; a population of food dispensing modules 120 configured to transiently (i.e., temporarily) install on various skids no over time, configured to be loaded with ingredients, and configured to dispense volumes or units of ingredients; a population of food processing modules 140 configured to transiently install on various skids no over time and to modify or otherwise interface with ingredients dispensed by adjacent food dispensing modules 120 installed on these skids no in order to transform or package these ingredients into units of food products of various types; infrastructure modules configured to transiently install on various skids no over time or integrated into these skids no and to provide controls, power, refrigeration, communications, ordering, and/or delivery functions to these skids no when deployed. In particular, the system 100 can include populations of skids no, food dispensing modules 120, food processing modules 140, and infrastructure modules that can be assembled and reconfigured over time to produce various types of food product, such as smoothies, cold bowls (e.g., cold salads), hot bowls (e.g., hot rice bowls), cold sandwiches, hot sandwiches, cold wraps, hot wraps (e.g., burritos), desserts, coffee products, etc.

Once a combination of food dispensing modules 120, food processing modules 140, and infrastructure modules are assembled onto a skid 110 (hereinafter a "skid assembly 102") to construct a particular type of food product, the skid assembly 102 can be loaded with a control program configured to intake food orders from patrons and to selectively actuate the food processing and dispensing modules to construct instances of this food product according to these food orders. The skid assembly 102 can then be loaded onto a truck or into a cargo van, which can then: navigate to these locations designated by remote patrons while the skid assembly 102 autonomously fulfills food orders received from these remote patrons and then serves food orders to patrons upon arrival at corresponding delivery locations; navigate to and temporarily stop at a populated area during a common meal period (e.g., a lunch hour) at which the skid assembly 102 autonomously receives and fulfills food orders entered by local patrons; and navigate to a fixed kiosk inside or near a building and install the skid assembly 102 into the fixed kiosk (and remove a second skid assembly 102 from the fixed kiosk). While occupying the kiosk, the skid assembly 102 can autonomously fulfill food orders received from patrons. Later, the skid assembly 102 can be removed from the kiosk, reloaded onto the truck, and returned to a warehouse where it is disassembled, cleaned, and reassembled in the same or different configuration in preparation for deployment to a "ghost kitchen" (e.g., inside a restaurant, bar, or airport), onto a truck, or into a kiosk (e.g., an open-air kiosk or enclosed fixed kiosk on a street corner), etc. during a next meal period.

The system 100 can be deployed to different locations at different time periods throughout the day and configured to serve different types of foods at these different locations and time points. For example, the system 100 can include a skid 110: configured to support a first set of food dispensing modules and a first set of food processing modules configured to make smoothies and to load onto a road vehicle in a first configuration; and configured to support a second set of food dispensing modules and a second set of food processing modules configured to make salad and to load onto a kiosk in a second configuration. The system 100 can deploy in the first configuration to a food truck park in the morning, and be prepared to deploy in the second configuration at a shopping center in the afternoon. Alternatively, a second skid can be prepared in the second configuration to replace the first skid before deploying to the shopping center in order to reduce time before deployment to a second location.

Therefore, the system 100 can include a set of skid assemblies no, food dispensing modules 120, food processing modules 140, and infrastructure modules that together form a modular "kit" of elements that can be assembled and reconfigured into skid assemblies no that can: autonomously construct instances of particular food products on-demand according to food orders received from patrons; be deployed to fixed locations (e.g., kiosks in malls, in airports, or on street corners); and/or that can be deployed on mobile transport vehicles (e.g., trucks or cargo vans that serve food to local patrons while temporarily parked or deliver food to remote patrons).

3. Examples

In one implementation shown in FIG. 1, a warehouse can be stocked with food dispensing modules 120, food processing modules 140, and skids 110; and technicians in the warehouse may (re)assemble these elements into skid assemblies 102, each configured to autonomously assemble units of a particular type of food product when deployed on a truck or into a kiosk.

For example, a food dispensing module 120 can be removed from a skid assembly 102, cleaned, serviced, reloaded with a particular ingredient (e.g., frozen blueberries, peanut butter, lettuce, or salt), and reinstalled in the same skid assembly 102 to support construction of the same type of food product or installed in a different skid assembly 102 to support construction of a different type of food product. In another example, a food dispensing module 120—installed in a skid assembly 102 configured to autonomously construct smoothies—can be loaded with frozen apple chunks during apple season (e.g., from July through February) and can be loaded with frozen strawberry slices during strawberry season (e.g., from April through June). Similarly, a skid assembly 102 can be configured with a first combination of food dispensing modules 120 and food processing modules 140 to construct hot breakfast-type bowls; deployed to a kiosk or loaded onto a vehicle (e.g., to form a mobile breakfast truck) to serve hot breakfast-type bowls on-demand to patrons on a weekday morning; returned to the warehouse; reconfigured with a second combination of food dispensing modules 120 and food processing modules 140 to construct smoothies; and redeployed to a kiosk or on a vehicle (e.g., to form a mobile smoothie truck) to serve smoothies on-demand to patrons during the same afternoon.

Similarly, the skid assembly 102 can be configured with a first combination of food dispensing modules 120 and food processing modules 140 to construct simple, plant-based fare; deployed on a vehicle (e.g., to form a mobile lunch truck) to serve plant-based fare on-demand to patrons on weekdays; returned to the warehouse; reconfigured with a second combination of food dispensing modules 120 and food processing modules 140 to construct more sophisticated fare containing hot meats; redeployed to a fixed kiosk (e.g., within a mall or at a street corner) to serve hot meals on-demand to patrons during weekends; and then returned to the warehouse and reconfigured with the first combination of food dispensing modules 120 and food processing modules 140 for the following Monday.

In another example, a first power module type containing a battery pack can be installed in a skid assembly 102 configured to produce cold bowls and loaded with food dispensing modules 120 containing ingredients designated for refrigerated- or room-temperature storage only (e.g., not configured to heat ingredients or to store frozen ingredients). In this example, when the skid assembly 102 is updated with a food processing module 140 configured to heat or cook an ingredient and/or with a food dispensing module 120 configured to store frozen ingredients—both of which can require more energy during a deployment—the first power module type can be replaced with: a second power module type containing a fuel-based generator if the skid assembly 102 is designated for deployment to an outdoor kiosk containing an exhaust vent; or a third power module type containing a backup battery pack and artificial intelligence inverter if the skid assembly 102 is designated for deployment to an outdoor kiosk or other location with access to grid power.

One vehicle (e.g., a truck, a cargo van) can then deploy many of these skid assemblies 110 over time. For example, a delivery-type truck including a lift and skid assembly 102 dock can: retrieve a reconditioned skid assembly 102 (e.g., a skid assembly 102 that was recently cleaned and assembled with food dispensing modules 120 fully-loaded with ingredients) configured to construct a first food type (e.g., cold bowls) from the warehouse; navigate to an outdoor kiosk near a business park; remove a second skid assembly 102 configured to construct a second food type (e.g., smoothies) deployed to this outdoor kiosk earlier on the same day (e.g., by the same or other delivery-type truck); replace the second skid assembly 102 with the reconditioned skid assembly 102; and return the second skid assembly 102 to the warehouse. The second skid assembly 102 can then be: reconditioned (e.g., cleaned and reassembled with the same configuration of food dispensing modules 120 fully-loaded with the same or similar ingredients) or reconfigured with a different combination of food dispensing modules 120 and/or food processing modules 140 to construct a different food product type; and then redeployed, such as to the same outdoor kiosk on the next day or loaded onto a mobile food truck for operation later on the same day.

In a similar example, a mobile food truck is: loaded with a first skid assembly 102 configured to dispense coffee and bagel-based sandwiches; dispatched to a first business park from the hours of 7 AM to 10 AM on a weekday to autonomously construct and serve coffee and bagel-based sandwiches to patrons; and called back to the warehouse after 10 AM. The first skid assembly 102 is then unloaded from the mobile food truck at the warehouse and replaced with a second skid assembly 102 configured to dispense salads. The mobile food truck is then dispatched to a second business park from 1130 AM to 130 PM on the same day to autonomously construct and serve salads to patrons; and called back to the warehouse after 130 PM, at which time the second skid assembly 102 is unloaded from the mobile food truck and replaced with a third skid assembly 102 configured to dispense smoothies. The mobile food truck is then dispatched to a location near a large public school or public gym from 3 PM to 530 PM on the same day to autonomously construct and serve smoothies to patrons. In this example, the mobile food truck can be driven manually to a target operating location by a human operator, and the human operator may then clean the skid assembly 102 loaded onto the mobile food truck and/or interface with patrons while the skid assembly 102 autonomously fulfills orders received from these patrons. Alternatively, the mobile food truck can include an autonomous vehicle that autonomously navigates between the warehouse and target operating locations, and a skid assembly 102 loaded onto this autonomous vehicle can autonomously fulfill orders received from local patrons while the autonomous vehicle is stopped at a target operating location or autonomously fulfill orders received from patrons as the autonomous vehicle autonomously navigates to delivery locations specified by these patrons.

Furthermore, a skid assembly 102 can be regularly returned to the warehouse, and food dispensing and processing modules 140 installed in the skid assembly 102 can be removed and replaced with like, pre-cleaned, and pre-loaded modules before the skid assembly 102 is redeployed to the field (e.g., on a truck, in a cargo van, or in a kiosk), thereby limiting downtime for the skid assembly 102 while also preserving cleanliness of modules and freshness of ingredients stocked in the skid assembly 102. Similarly, an individual food dispensing and processing module 140 in this skid assembly 102 can be replaced with a like, pre-cleaned, and pre-loaded module while the skid assembly 102 is deployed in the field.

4. Skid

Figure 4:
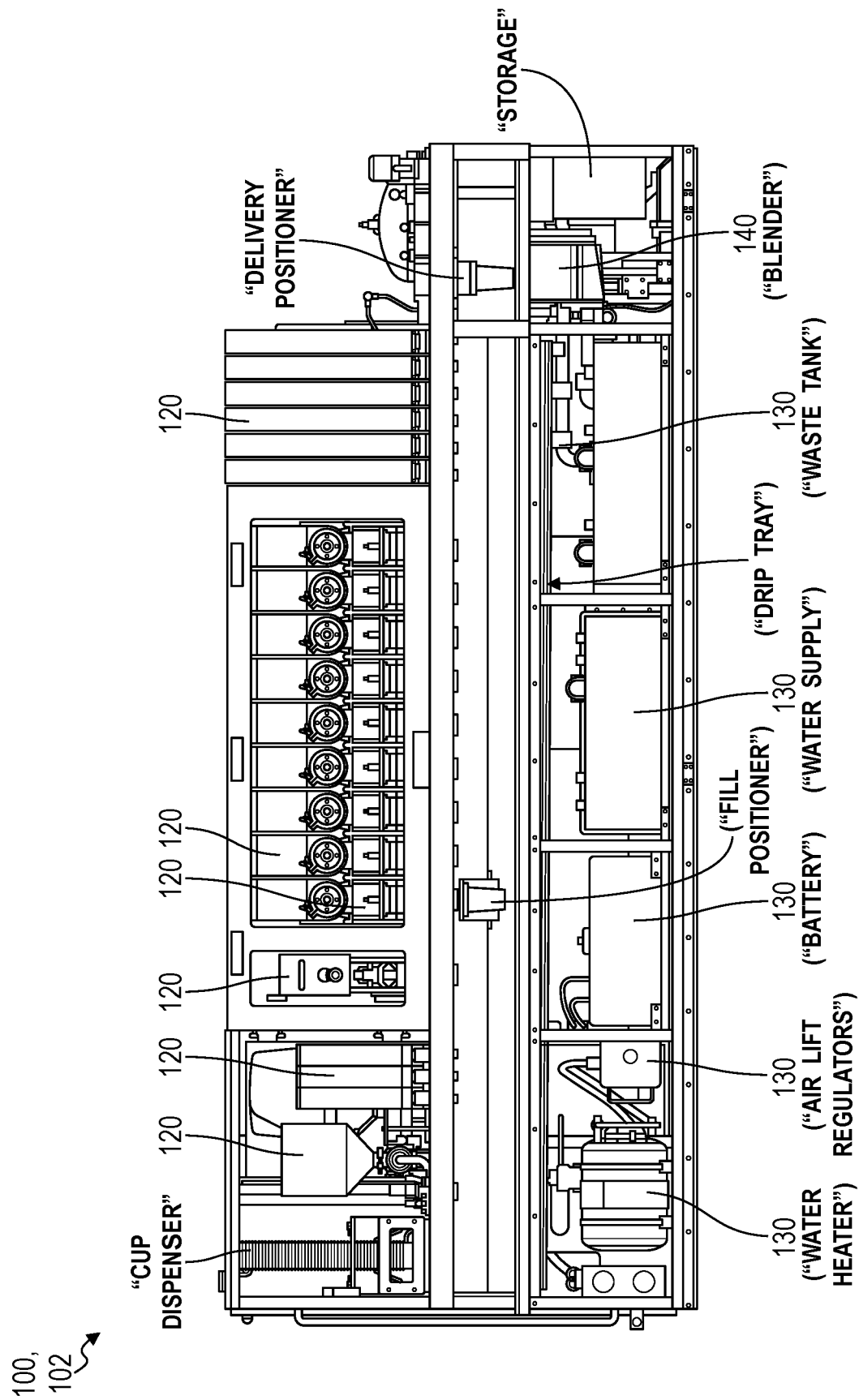
FIG. 4 is a schematic representation of one variation of the system.

The system 100 includes a skid 110 configured to transiently load onto a road vehicle, configured to transiently install in a kiosk, and including a conveyor 180. Generally, a skid 110 is defined as a base platform or "chassis": configured to support and locate a combination of food dispensing modules 120, food processing modules 140, and infrastructure modules as shown in FIG. 4; configured for transport within a facility or warehouse when cleaned and reconfigured or reassembled with various modules; configured to load onto a truck for transport out of the warehouse, such as a transport-type vehicle for delivery and loading into a kiosk or onto a mobile food truck for mobile fulfillment of food orders. For example, a skid 110 can define a rigid platform including features for: transport within a warehouse with a hand truck; loading onto a truck or into a kiosk; fixing to a truck bed or to a skid 110 rack within a kiosk; and unloading from a truck or kiosk.

In one implementation, the skid 110 includes a steel box frame or hygienically-designed tube frame; with steel or aluminum bed supported on each corner by a fixed for rotating caster; defining a set of lift points for lifting with a crane, lifting with a forklift, winching onto a dock; and defining a set of hard points for locating and locking the skid 110 to a truck bed, inside a cargo van, to a rack within a kiosk, or to a dock of any other type.

In another implementation shown in FIG. 7, the skid 110 includes a set of skates 112 configured to locate and lock the skid 110 to a dock, such as in a truck bed or within a kiosk. For example, the skid 110 can include a set of linear skates 112 that can be configured to engage and slide along a set of linear guides extending along a truck bed or along a kiosk; once the skid 110 is loaded onto and slid along these guides, the skid 110 can be locked or fastened to the guides. Once locked into position in the bed of the truck, the skid 110 can be transported to a shopping center and unloaded from the bed of the truck onto a kiosk defining a second set of guides. The skid 110 can lock into position via the set of skates 112 and the second set of guides. Therefore, the skid no can be loaded and unloaded from a dock (e.g., by a technician) via the set of linear skates 112 and safely transported between different locations and different docks by locking the linear skates 112 into the linear guides.

In one variation, the skid no can include a set of equipment statically installed on the skid no. For example, the skid 110 can include: a set of water tanks configured to store clean water for rinsing equipment on the skid no and to collect waste water and other waste generated by the skid assembly 102; a set of sinks for washing equipment on the skid assembly 102; a set of water heaters; and/or a set of batteries for powering food handling and infrastructure modules installed on the skid no.

4.1 Food-Handling Slots

As shown in FIG. 1, the skid no can include a set of food-handling slots 116 configured to transiently locate a set of food dispensing modules 120 and food processing modules 140 along a food-handling side of the skid no, such as a first long side of the skid no. In one implementation, the skid no defines food-handling slots 116 of a fixed unit dimension and configured to transiently receive food dispensing and processing modules 140 defining a standard footprint. In this implementation, individual food dispensing and processing modules 140 can be loaded into individual food-handling slots 116 along the food-handling side of the skid no to form an assemblage of modules that cooperate to dispense a particular combination of ingredients and to construct these ingredients into a food product of a particular type.

More specifically, the skid 110 can include a set of food-handling slots 116 defining a first set of food-handling slots 116 configured to dispense liquids and a second set of food-handling slots 116 configured to dispense solid ingredients. For example, in this implementation, individual beverage dispensing modules can be loaded into a first food-handling slot 116 along the food-handling side of the skid 110, individual food dispensing modules 120 can be loaded into a second food-handling slot 116 along the food-handling side of the skid 110, and individual processing modules 140 can be loaded into a third food-handling slot 116 along the food-handling side of the skid 110. Then, upon receiving an order for a particular smoothie, the system can: dispense a first volume of juice into a blender located below a first dispenser at the first food-handling slot 116; dispense a second volume of frozen fruit into the blender now located below a second dispenser at the second food-handling slot 116; and locate the blender at the third food-handling slot 116 for blending of the ingredients to make the smoothie.

Alternatively, the skid 110 can define a continuous module rack or otherwise unabridged slots for food-handling modules along the first side of the skid 110. For example, the skid 110 can include a single continuous rail or a set of continuous, parallel rails extending along the food-handling side of the skid 110 parallel to the anteroposterior axis of the skid 110. In this example, a food dispensing or processing module 140 can be loaded onto the rail(s), shifted longitudinally to a desired longitudinal position, and then locked onto the linear rack, such as with a threaded fastener or with a clamp.

However, the skid 110 can include or define delineated food-handling slots 116 or a continuous food-handling rack in any other form and can interface with food dispensing and processing modules 140 in any other way.

4.2 Infrastructure Slots

Similarly, the skid 110 can include a set of infrastructure slots configured to transiently receive infrastructure modules, such as power, compressor, and refrigeration modules, as shown in FIG. 1. For example, the skid 110 can define a row of infrastructure slots configured to house infrastructure modules of fixed unit dimension (e.g., fixed width, height, and depth) and arranged along an infrastructure side of the skid no, such as opposite the food-handling side of the skid no. Alternatively, the skid 110 can include a linear rack arranged along the infrastructure side of the skid no and configured to receive and locate various combinations of infrastructure modules of various widths.

Yet alternatively, the skid no can include a set of infrastructure slots arranged in its base, such as under the deck of the skid no.

The skid no can also include an electrical power supply, air supply, and/or data bus extending between infrastructure and food-handling slots 116 and configured to: distribute electrical power from a power module 132 installed in a power slot; distribute pressurized air from a compressor unit installed in a compressor slot; and/or distribute control signals and sensor signals between these food dispensing, food processing, and infrastructure modules.

5. Infrastructure Modules

The system 100 also includes a set of infrastructure modules configured to transiently install on a skid no and to support infrastructure-type functions at the skid no, such as power supply, regulated air pressure supply, refrigeration, communications, and patron interface (e.g., ordering, order handoff) functions, as shown in FIG. 1. These infrastructure modules are configured to be transiently installed into a skid 110 and later removed from the skid 110, such as for servicing, to support a different combination of food dispensing modules 120 installed on the skid no, or if the skid no is redeployed to a different environment (e.g., with different communications or power infrastructure). Additionally or alternatively, some or all of these infrastructure modules can be integrated (i.e., permanently incorporated) into a skid no. Alternatively, some or all of these infrastructure modules can be removed from the skid, and instead coupled to the skid from an external source (e.g., a road vehicle, a kiosk) as needed to preserve space in the skid for other modules.

5.1 Power

In one implementation, the system 100 includes a set of power modules 132; when installed in a power slot (or on a continuous infrastructure rack in the skid no more generally), a power module 132 can supply regulated power to the power bus. For example, the system 100 can include a first power module type containing a main battery pack; an instance of the first power module type can thus be installed in a skid assembly 102 designated for deployment to an indoor location at which grid power is not available. The system 100 can also include a second power module type containing a generator, a fuel cell, and a backup battery pack. An instance of the second power module type can thus be installed in a skid assembly 102 designated for deployment to an outdoor location at which grid power is not available. The system 100 can further include a third power module type containing a power inverter. An instance of the third power module type can thus be installed in a skid assembly 102 designated for deployment to an indoor or outdoor location at which grid power is available. However, in this example, a skid 110 can also include an integrated power connector to connect the power bus to a 12-volt (and/or 24-Volt, 5-Volt) regulated power supply of a vehicle. A skid assembly 102 can thus source power from a vehicle via the power connector while in transit. A power module 132 can thus be omitted from a skid assembly 102 that is designated for deployment on a truck (i.e., rather than installation into a kiosk). Alternatively, once an instance of the first power module type is installed into a skid assembly 102, batteries in this power module 132 can be recharged by a vehicle via the power connector while the skid assembly 102 is in transit.

However, the system 100 can include a power module 132 of any other type. A skid assembly 102 can also be outfitted with multiple power modules 132 of the same or different type, such as based on: an estimated power consumption per unit time of the skid assembly 102 (e.g., based on type of food processing modules in the skid assembly 102 and related temperature control requirements for these modules); and a designated deployment time for the skid assembly 102 (e.g., one hour, one meal period, one day). For example, a skid assembly 102 can be outfitted with: two instances of the first power module type, which are predicted to power the skid assembly 102 for the first four hours of a six-hour deployment; and one instance of the second power module type loaded with a sufficient volume of liquid fuel to meet power requirements for the final two hours of this deployment.

In one variation, the system 100 can include a fixed power installation decoupled from the skid assembly 102 and installed directly to a unit configured to transport the skid assembly 102 (e.g., a road vehicle). For example, a power module 132 can be excluded from the skid 110 and assembly and rather permanently installed on a road vehicle configured to deploy the skid assembly 102 to various locations for serving food and/or to transport the skid assembly 102 to a fixed location (e.g., a fixed kiosk at an airport). The power module 132 permanently installed on the road vehicle can include an integrated power connector for connecting the power bus to a 12-Volt regulated power supply of the road vehicle. At a first time, when the skid assembly 102 is loaded in the road vehicle and deployed to an outdoor food truck park, the skid assembly 102 can connect to the power supply of the road vehicle to power the food dispensing, food processing, and infrastructure modules. At a second time, when the skid assembly 102 is transported via the road vehicle and then loaded onto a fixed kiosk at a shopping center, the skid assembly 102 can connect to a grid power system accessible at the shopping center to power the food dispensing, food processing, and infrastructure modules.

5.2 Controls

A skid 110 can include an integrated controller 150 configured to: receive or access orders submitted by patrons via a user interface arranged on the housing 160, arranged on the truck, integrated into the kiosk, or within a native food ordering application executing on user's mobile computing device; and handle autonomous fulfillment of these orders by triggering actuation of food dispensing and processing modules 140 in the skid assembly 102, such as via the database described above.

The skid no can also include a wireless communication module coupled to the controller 150 and configured to: receive food orders for patrons; communicate errors, order fulfillment data, and/or fill status of food dispensing modules 120 in the skid assembly 102 to a remote computer system; and receive control-related updates executable by the controller 150 when processing food orders.

Alternatively, the controller 150 and wireless communication module (and/or other controls- and communications-related subsystems) can be arranged in a controls module configured to transiently install in a skid assembly 102.

In one variation, a food dispensing module 120 described below includes a sub-controller 150 configured to locally control dispensation of metered volumes of an ingredient contained in this food dispensing module 120—such as by implementing closed-loop controls to drive actuators in the food dispensing module 120 based on outputs of various sensors integrated into the food dispensing module 120—responsive to receipt of a command from the controller 150 to dispense this amount of the ingredient. Similarly, a food processing module 140 described below can include a sub-controller 150 configured to locally control execution of a food processing cycle responsive to receipt of a command from the controller 150 to process ingredients dispensed into a container now located in or under the module.

5.3 Module-Level Cooling

In another variation shown in FIG. 2, the system 100 includes a remote refrigeration module 134 that: contains an evaporator unit 134*a* and a condenser unit 134*b*; is configured to transiently install in an infrastructure slot on a skid no; and is configured to distribute cooled refrigerant to individual food dispensing modules 120 or to groups of food dispensing modules 120 installed in a skid assembly 102. In particular, the remote refrigeration module 134 can be located remotely from the food-handling side of the skid 110 and from food-handling modules but can be fluidly or thermally coupled to select food dispensing modules 120 installed in the skid assembly 102 in order to cool or freeze ingredients stored in these modules, thereby reducing weight and complexity of individual food dispensing modules 120 to simplify installation and redeployment of these food dispensing modules 120 and reducing footprint of these individual modules to enable a greater number of food-handling modules to be assembled per linear foot of the food-handling side of a skid 110.

Furthermore, the system 100 can include an insulated housing 134*c* configured to enclose ingredient storage volumes—in food dispensing modules 120—loaded with ingredients designated for cooling. Thus, in this implementation, the insulated housing 134*c*: can be constructed around a first set of food dispensing modules 120 containing ingredients designated for cooling (or freezing); can thermally isolate these food dispensing modules 120, such as from other sets of food dispensing modules 120 containing room-temperature or heated ingredients; and can be coupled to the remote refrigeration module 134 to cycle through chilled refrigeration and thus cool ingredients in the first set of food dispensing modules 120. In particular, in this implementation, food dispensing modules 120 containing ingredients designated to be cooled can be grouped together and located within one (or a small number of) insulated housing 134*cs* and cooled via the remote refrigeration module 134. A second set of food dispensing modules 120 containing ingredients designated for room-temperature storage can be similarly grouped (and located in a thermally-insulated room-temperature housing), and a third set of food dispensing modules 120 containing ingredients designated for higher-temperature storage can be similarly grouped (and located in a thermally-insulated heated housing, which can be similarly coupled to a remote heating module).

For example, the system 100 can include a skid 110 assembled with a first set of food dispensing modules 120 including: a first subset of food dispensing modules 120, loaded with frozen fruit for blending in smoothies, grouped together and enclosed by a first housing coupled to a refrigeration module 134 and configured to keep ingredients frozen; a second subset of food dispensing modules 120, loaded with chilled vegetables for mixing in salads, grouped together and enclosed by a second housing coupled to the refrigeration module 134 and configured to keep ingredients chilled but not frozen; a third subset of food dispensing modules 120, loaded with spices (e.g., cinnamon, salt and pepper) for flavoring smoothies and salads, and grouped together and enclosed by a third housing uncoupled from the refrigeration module 134 and configured to keep ingredients at room temperature.

The system 100 can also include a second insulated housing 134*c* configured to enclose food processing modules 140 that handle cold foods, such that ingredients stay cold during processing (e.g., smoothies can be served cold) and can be served at a target temperature (e.g., between 35 degrees Fahrenheit and 40 degrees Fahrenheit). For example, the system 100 can include: a first insulated housing 134*c* configured to enclose ingredient storage volumes—in food dispensing modules 120—loaded with ingredients designated for cooling; a second insulated housing 134*c* configured to enclose ingredient processing modules 140 (e.g., blenders for blending frozen smoothies). Therefore, ingredients designated for cooling can be cooled both during storage and during processing, such that food is served at chilled temperatures and that safety standards for food temperatures are upheld.

In one implementation, the refrigeration module 134 can include: an evaporator unit 134*a* configured to mount near a set of food dispensing modules configured to dispense frozen or cooled ingredients; and a condenser unit 134b arranged remotely from the evaporator unit 134a and configured to cool refrigerant pumped to the evaporator unit 134a. In one example, a set of food dispensing modules designated for frozen foods and the refrigeration module 134 are installed in a contiguous group of slots on the skid with the refrigeration module 134 located near a center of this group of food dispensing modules. In this example, an insulated housing 134c is then installed around this group of food dispensing modules and the refrigeration module 134, and the refrigeration module 134 is then fluidly coupled to the condenser unit 134b installed in an infrastructure slot in the module. Thus, when the condenser unit 134b is activated by the controller, the condenser unit 134b can pump compressed refrigerant to the evaporator unit 134a, which absorbs and removes heat from inside the insulated housing 134c to cool the food dispensing modules before this heated refrigerant is returned to the condenser unit 134b. Therefore, in this implementation, the evaporator unit 134a can define a geometry or footprint similar to that of a food dispensing module and can be configured to install in a food handling slot of a skid 110 alongside food dispensing modules designated for frozen foods.

Figure 5:
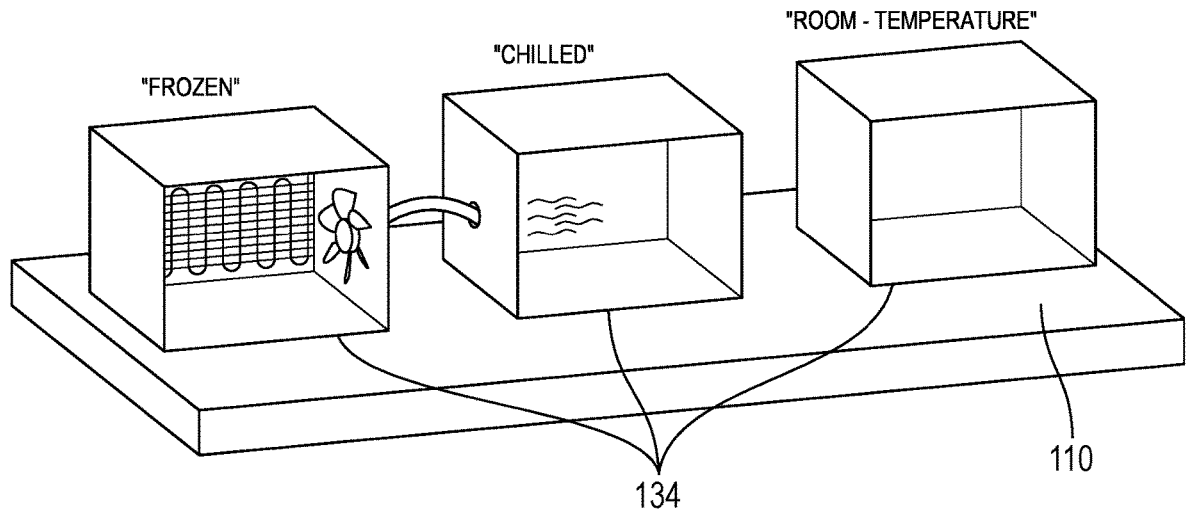
FIG. 5 is a flowchart representation of one variation of the system.

Furthermore, in the foregoing implementation, the system 100 can include multiple sets of food dispensing modules 120 configured to dispense ingredients at different temperatures (e.g., frozen, cooled, room-temperature). In one example, a first set of food dispensing modules designated for frozen foods, a second set of food dispensing modules designated for cooled (e.g., refrigeration but not frozen) foods, and the refrigeration module 134 are installed in a contiguous group of slots on the skid. In this example, a first insulated housing 134c is then installed around the first set of food dispensing modules and the refrigeration module 134, and the refrigeration module 134 is then fluidly coupled to the condenser unit 134b installed in an infrastructure slot in the module. A second insulated housing 134c is then installed around the second set of food dispensing modules, and an interior enclosed by the first insulated housing 134c is then coupled via a coupling device (e.g., a vent, pipe, hose) to an interior enclosed by the second insulated housing 134c such that cold air can be siphoned from within the first insulated housing 134c to the second insulated housing 134c. As shown in FIG. 5, a fan can be located near the coupling device within the first insulated housing 134c such that the fan blows cold air enclosed in the first insulated housing 134c to the second insulated housing 134c via the coupling device. Thus, when the condenser unit 134b is activated by the controller, the condenser unit 134b can pump compressed refrigerant to the evaporator unit 134a, which absorbs and removes heat from inside the first insulated housing 134c to cool the first set of food dispensing modules. Then, the cooled air in the first insulated housing 134c can be siphoned into the second insulated housing 134c via the coupling device to cool the second set of food dispensing modules. Therefore, in this implementation, a single evaporator unit 134a can be configured to install in a food handling slot of a skid 110 alongside multiple food dispensing modules 120 designated for foods of various temperatures.

Therefore, the insulated housing 134c and the remote refrigeration module 134 (e.g., the condenser unit 134b) can cooperate to cool a set of food dispensing modules 120 in aggregate and separately from other food dispensing modules 120 containing ingredients that are stored at room temperature and/or heating. The system 100 can therefore also include other insulated housing 134cs configured to install around and thermally isolate other groups of food dispensing modules 120 in a skid assembly 102. The system 100 can further include a remote heating module similarly configured to cooperate with an insulated housing 134c to heat ingredient storage volumes in a group of food dispensing modules 120. Additionally or alternatively, food dispensing and processing modules 140 configured to store or process ingredients at elevated temperatures can include integrated heating elements.

5.4 Water Storage

In one variation, the system 100 includes a set of water storage modules configured to install within the skid 110 for supplying water to other modules. For example, the fixed infrastructure 170 can include a set of water storage tanks configured to supply fresh water to food processing modules (e.g., for local module cleaning between food processing cycle) and to collect waste water (e.g., from food dispensing modules following cleaning cycles).

In one implementation, the fixed infrastructure 170 installed on the skid 110 can include a water supply module. The water supply module can include: a water supply tank; a set of hoses for coupling the water supply tank to other modules of the skid no; and/or a waste tank. For example, the system can include a water supply module including a water supply tank coupled to a food processing module 140 via a hose for washing food processing units (e.g., a blender). After blending a smoothie with a blender in the food processing module, the controller can trigger the food processing module to source water from the water supply tank in the water supply module for rinsing the blender.

In another implementation, the skid assembly 102 is configured to load onto a vehicle equipped with an integrated fixed water supply tank. In this implementation, the fixed water supply tank can supply water to food dispensing modules 120, food processing modules 140, and other infrastructure modules in the skid assembly 102. If the skid no is removed from the vehicle and operated at a location (e.g., a kiosk at an airport) equipped with an external water supply, the skid assembly 102 can couple to the external water supply to supply water to the food dispensing, food processing, and infrastructure modules. For example, the skid 110 can be loaded into a cargo van equipped with a fixed water supply tank and deployed in the cargo van to a business park for serving smoothies in the morning. The skid assembly 102 and modules can couple to the fixed water supply tank located on the cargo van. Later that day, when the skid assembly 102 is unloaded from the cargo van and into a fixed kiosk, the skid assembly 102 and modules can couple to a local water source located near the fixed kiosk.

In one variation, the system 100 includes a fluid waste tank configured to store wastewater and other waste liquids. For example, the system 100 can source water from a water storage module to supply to a food processing module 140 to rinse a blender after blending ingredients to make a smoothie. The system 100 can then collect dirty water from rinsing the blender in a drip tray located below food handling modules and configured to collect dirty water and/or other liquids and to filter these liquids into a gravity-fed waste tank. Additionally, any spillage of dry ingredients or liquid ingredients can fall into the drip tray and travel to the waste tank. The fluid waste tank can further include a strainer configured to collect solid materials flowing from food dispensing modules and prevent these materials from flowing into the fluid waste tank.

5.5 Conveyor

A system can further include a conveyor module 118 configured to install along a food-handling side of a skid no and to move a container or other packaging along a sequence of food dispensing and processing modules 140 as the container or packaging is filled with ingredients and processing (e.g., blended, mixed, heated) according to a food order received from a patron. For example, the conveyor module 118 can include a continuous belted conveyor 180, a small-scale automated pallet system, or a guided linear actuator.

Alternatively, a conveyor 180 can be integrated into a skid 110, as shown in FIG. 1.

5.6 Variation: Air Supply

In one variation, food dispensing and processing modules 140 include pneumatic actuators (e.g., rather than electromechanical actuators). In this variation, the system 100 can further include a compressor unit that contains a compressor and reservoir. When installed in a skid assembly 102, the compressor unit can be coupled to a manifold—integrated into the skid 110—that includes a set of taps arranged along the manifold and an electromechanical solenoid valve arranged on each tap and controlled by the controller 150. Food dispensing and processing modules 140 also installed in this skid assembly 102 can be coupled to these taps, such as via quick-release pneumatic line connections. Thus, the controller 150 can trigger actuators within these food dispensing modules 120 and processing modules 140 by selectively triggering the corresponding solenoid valve on the manifold to open, thereby releasing air pressure from the compressor unit to these food dispensing and processing modules 140. In a similar variation, the system 100 includes a gas supply module loaded with pre-filled compressed gas tanks, such as containing nitrogen or argon. For example, a skid assembly 102 can siphon inert gas from a gas supply module to package and seal a food container after fulfilling an order received from a user.

Alternately, a skid 110 can include an integrated compressor, reservoir, compressed gas tank, manifold, and solenoid valves, etc.

Furthermore, the system 100 can include a vacuum module that similarly includes a vacuum pump and a vacuum reservoir; or a skid 110 can include an integrated vacuum pump, vacuum reservoir, and vacuum manifold, etc.

5.7 Variation: Cleaning Module

The system 100 can also include a cleaning module configured to clean equipment on the skid. For example, the system 100 can include a cleaning module defining a set of sinks for washing equipment. The set of sinks can be fluidly coupled to a water supply tank for rinsing food processing equipment (e.g., blenders, mixing utensils) and/or food dispensers. Additionally, the set of sinks can be fluidly coupled to a wastewater storage tank configured to collect waste generated on the skid no.

6. Housing and Ordering Interface

Figure 3A:
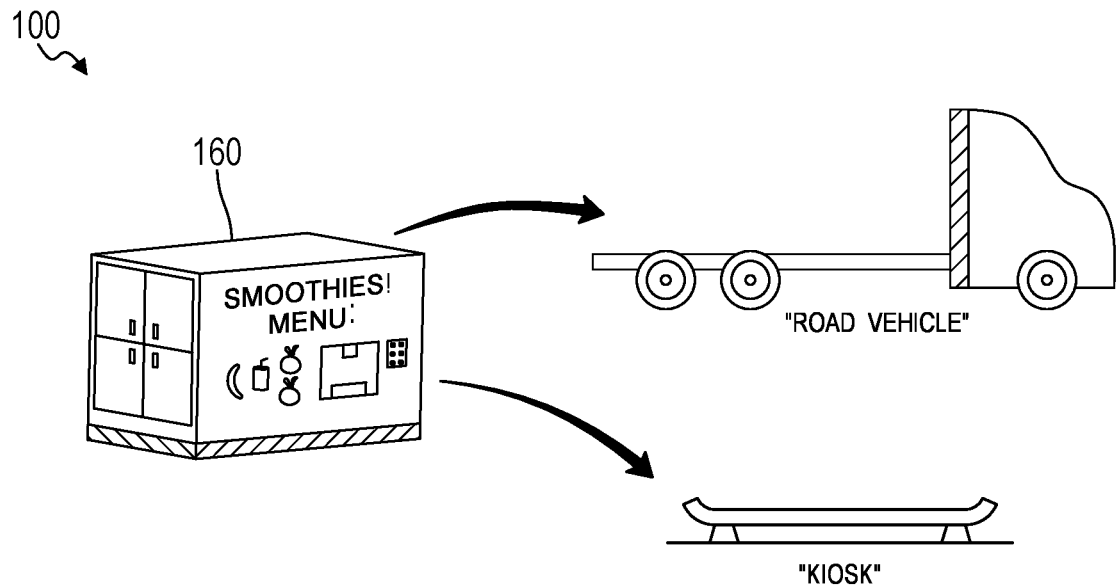
FIGS. 3A and 3B are flowchart representations of one variation of the system.
Figure 3B:
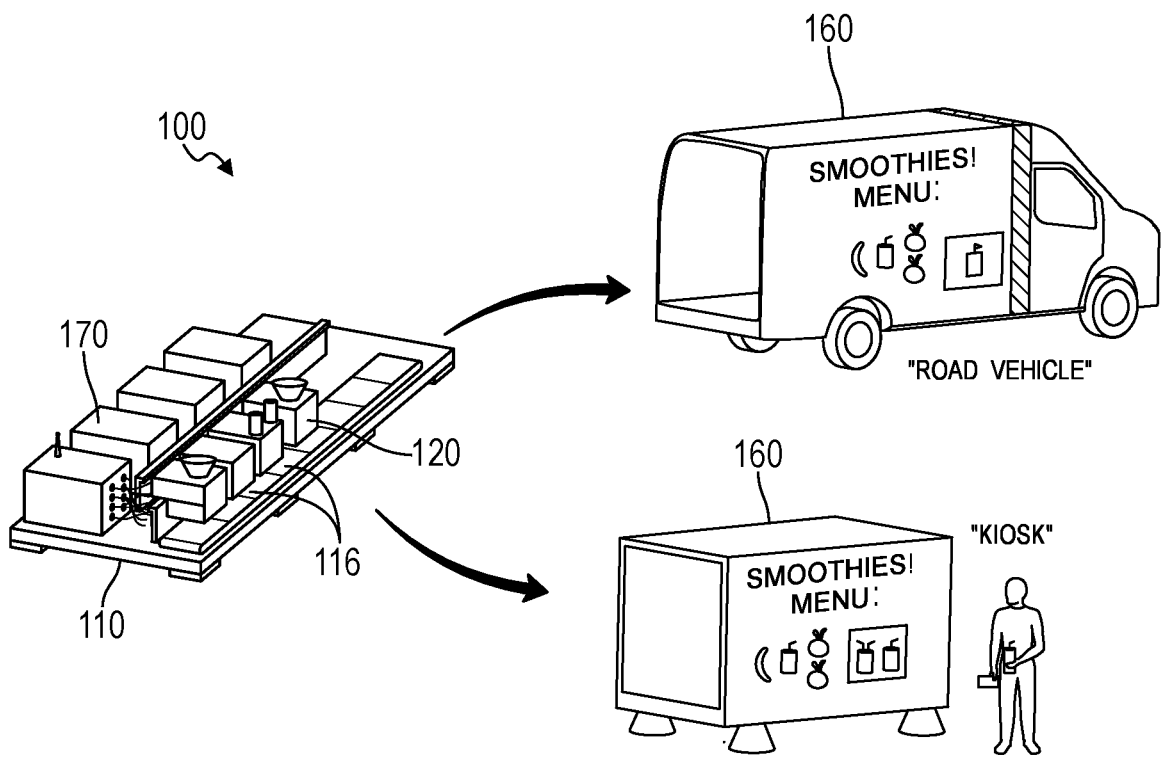

As shown in FIGS. 3A and 3B, the system 100 can also include an exterior housing 160 configured to enclose food dispensing, processing, and infrastructure modules, the conveyor 180, etc. installed on a skid no and to define an exterior façade for users interacting with or viewing a skid assembly 102, thereby both concealing these modules from view and enabling tighter control of an environment (e.g., temperature, humidity) inside the skid assembly 102. For example, the exterior housing 160 can be installed on a skid assembly 102 in preparation for deploying the skid assembly 102 on a module food truck in which the skid assembly 102 is exposed. For a skid no operable in multiple configurations—such as a first configuration for deployment on a road vehicle and a second configuration for placement at a kiosk—the exterior housing 160 can be installed on the skid 110 such that it is compatible with both configurations. For example, the skid 110, including the housing 160, can be deployed on the bed of a truck and/or located at a fixed location as a kiosk. In this example, the housing 160 can define the exterior façade of the skid assembly 102 for both skid 110 configurations.

In this variation, the housing 160 can also include a physical ordering interface 190—such as in the form of a touchscreen and point-of-sale unit—configured to present menu options to users, to record food orders from users, and to collect payment information from users, as shown in FIG. 1.

Figure 6:
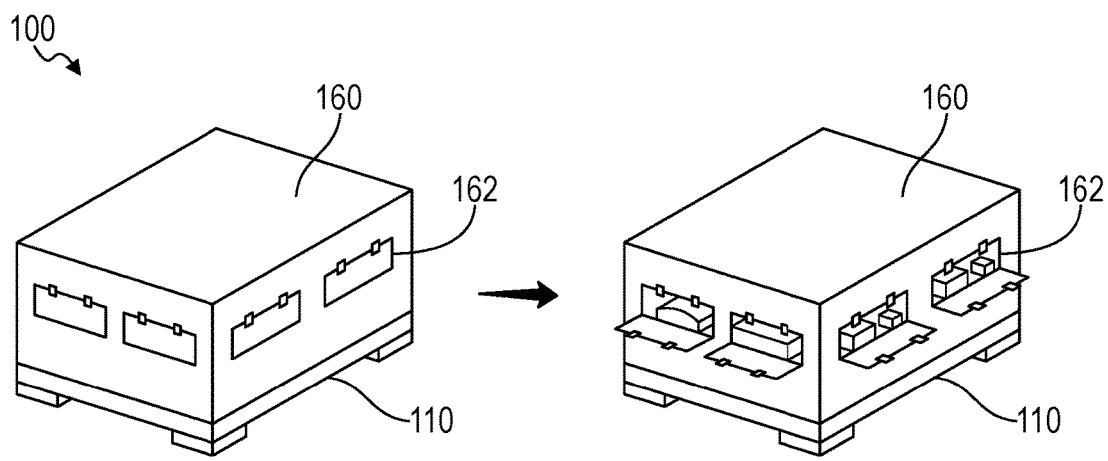
FIG. 6 is a schematic representation of one variation of the system.

As shown in FIGS. 6 and 7, the housing 160 can also include a set of inspection windows 162, configured to open and close for viewing of the food dispensing, processing, and infrastructure modules installed on the skid 110 and enclosed in the housing 160. For example, a set of inspection windows 162 that open and close can be installed on the housing 160 in preparation for food safety inspections that can occur when a module food truck loaded with the skid 110 is deployed. An inspector can open the windows to view modules enclosed by the housing 160 without removing modules from the housing 160 and/or module food truck. In another example, an inspector can insert a thermometer through an inspection window in order to measure the temperature of a particular ingredient. Similarly, a technician may view an interior of the housing 160 by opening inspection windows 162 for maintenance inspections while the module food truck is deployed, for minimal disturbance of food truck operations.

However, the exterior housing 160 can be omitted from a skid assembly 102 designated for deployment inside a cargo van or kiosk, which can define a façade around the skid assembly 102, such as shown in FIG. 1. For example, a skid 110 can be operable in a first configuration configured to load into a cargo van, the exterior of the cargo van defining the exterior façade around the skid assembly 102. The skid 110 can also be operable in a second configuration configured to load into a kiosk, the exterior of the kiosk defining a fixed housing 160 in which the skid 110 is loaded. In this implementation, the physical ordering interface 190 can be integrated into the cargo van or kiosk. Alternatively, a native ordering application or an ordering interface 190 within a web browser executing on a user's mobile computing device can present menu options for the skid assembly 102 to a user, record a food order from the user, collect payment information from the user, and then serve this food order to the skid assembly 102 for fulfillment.

7. Food-Handling Modules

The system 100 also includes: a set of food dispensing modules 120, each configured to transiently install on the skid 110 proximal the conveyor 180 and configured to dispense a volume of an ingredient toward the conveyor 180; and a set of food processing modules 140, each configured to transiently install on the skid no proximal the conveyor 180 and configured to modify ingredients dispensed from food dispensing modules 120 onto the conveyor 180. Generally, the system 100 includes a population of food dispensing modules 130 and food processing modules 140 configured: to be loaded into skids no; to dispense and modify ingredients, respectively, responsive to control inputs received from controllers 150 in these skids no; and to then be removed from these skids 110 for cleaning and reloading with ingredients before deployment.

7.1 Food Dispensing Module Types

In one implementation, the system 100 includes liquid dispensing modules configured to dispense metered volumes of liquid, such as juice, water, and low-viscosity (or "thin") sauces. In a similar implementation, the system 100 includes food paste dispensing modules configured to dispense metered volumes of gels and higher-viscosity liquids, such as butters, yogurt, and thick sauces. In these implementations, a liquid or food paste dispensing module can also include an in-line chiller configured to cool dispensed liquid, such as: one integrated in-line chiller per liquid or food paste dispensing module; or one integrated in-line chiller shared between a group of liquid and/or food paste dispensing modules.

In another implementation, the system 100 includes frozen-food dispensing modules 120 configured to dispense metered volumes or mass units of ice, frozen fruits, and frozen vegetables.

In yet another implementation, the system 100 includes slicing-type dispensing modules configured: to be loaded with whole (or nearly-whole) units of ingredients, such as lettuce, onion, tomato, kiwi, or apple; to slice stored ingredients when triggered by controllers 150; and to dispense ingredient slices.

In another implementation, the system 100 includes powder food dispensing modules configured to dispense metered volumes or mass units of powdered goods, such as salt, sugar, spices, or seeds.

The system 100 can include any combination of these types of food dispensing modules 120. In one variation, the system 100 includes multiple sets of food dispensing modules. For example, the system 100 can include: a first set of food dispensing modules configured to dispense metered volumes of different flavored yogurts; a second set of food dispensing modules configured to dispense metered volumes of frozen fruits; and a third set of food dispensing modules configured to dispense different liquid bases (e.g., coffee, orange juice, milk). In response to receiving an order for a particular smoothie, the system can dispense: a first volume of vanilla yogurt; a second volume of frozen pineapple; and a third volume of orange juice.

However, the system 100 can include food dispensing modules 120 configured to dispense or meter ingredients of any other type or format.

7.2 Food Processing Modules

In one implementation, the system 100 includes food cooking modules configured to heat or cook ingredients. For example, the system 100 can include a food processing module 140 configured to: store meat; load a unit of a meat; cook the meat, such as with an in-line heating element, a fryer, a one- or two-sided griddle, or a microwave; and to then dispense this cooked meat unit toward a conveyor 180. In another example, the system 100 includes a food processing module 140 configured to heat or cook ingredients previously dispensed by upstream food dispensing modules 120 in a skid assembly 102, such as: heating and pressing a sandwich assembled by upstream food dispensing modules 120; or microwaving ingredients contained in a bowl filled with ingredients by upstream food dispensing modules 120.

In another implementation, the system 100 includes food blending modules configured to blend ingredients dispensed (e.g., into a cup) by upstream food dispensing modules 120 in order to transform these ingredients into smoothies.

In a similar implementation, the system 100 includes food mixing modules configured to mix or toss ingredients dispensed (e.g., into a bowl) by upstream food dispensing modules 120, such as in order to toss salads.

In one implementation, the system 100 includes a skid 110 operable in multiple configurations, each configuration to support a unique set of food processing modules 140. For example, in a first configuration, the skid no can be configured to include food blending modules for blending ingredients to make a smoothie. In a second configuration, the skid no can be configured to include mixing modules for mixing ingredients to make a salad. Additionally and/or alternatively, a third configuration can be configured to include both food slicing modules and mixing modules for slicing vegetables and mixing them to make a salad.

In another implementation, the system 100 includes packaging modules, such as: an upstream packaging module configured to dispense a food container (e.g., a cup, a bowl, a paper wrapper) at the head of a set of food dispensing modules 120; and a downstream packaging module configured to close a food container loaded with ingredients by upstream food dispensing modules 120, such as by placing a lid on a cup, placing a lid on a bowl, or wrapping a paper wrapper.

However, the system 100 can include any other type of food processing module 140 configured to modify ingredients dispensed by upstream food dispensing modules 120 in any other way.

7.3 Handoff

As described above, the system 100 can include discrete conveyor modules or include skids 110 that contain integrated conveyors 180 configured to index a new food unit along food dispensing modules 120 arranged in skid assemblies no, as described above.

In one variation, the system 100 additionally or alternatively includes handoff modules configured to move food units between or within food dispensing and/or processing modules 140. For example, a handoff module can include a robotic arm configured to move a food unit to a different orientation and/or position within a food dispensing module 120 prior to the food dispensing module 120 dispensing a unit or metered amount of its ingredient into or onto the food unit. In another example, a handoff module includes a lift configured to raise a food unit (e.g., off of the conveyor 180) toward an output of a food dispensing module 120, such as to increase accuracy with which the food dispensing module 120 dispenses a unit or metered amount of its ingredient into or onto the food unit. In another example, a handoff module is configured to load a completed food product unit and to serve this food product unit to a patron, such as through a handoff or delivery window downstream of food dispensing and processing modules 140 in a skid assembly 102, as shown in FIG. 1.

In this example, the system can include a skid configured to load onto a road vehicle in a first configuration. In response to receiving an order for a salad from a patron, the system can manipulate a robotic arm to move a food unit to different positions within a food dispensing module to dispense various salad ingredients. When the salad is complete, the system can serve the salad—via the robotic arm—to the patron through a window defined by a housing 160 of the skid in the first configuration loaded on the road vehicle.

However, the system 100 can include handoff modules of any other type or format configured to interface with food units, food dispensing modules 120, and/or food processing modules 140 in any other way.

8. Skid Assembly (Re)Configuration

In one implementation, cleaned and loaded food dispensing modules 120 are stored on racks in a warehouse, such as grouped by type of ingredient. For example, food dispensing modules 120 loaded with ingredients designated for freezing can be stored on racks in a walk-in freezer; food dispensing modules 120 loaded with ingredients designated for refrigeration can be stored on racks in a walk-in refrigerator; and food dispensing modules 120 loaded with dry ingredients can be stored in humidity-controlled closets. Cleaned food processing and infrastructure modules ready for (re)deployment can be similarly stored on racks in the warehouse.

To (re)configure a skid assembly 102, a technician may retrieve food dispensing, processing, and infrastructure modules—from their racks within the warehouse—according to a specification for: type of food product (e.g., smoothie, cold salad, hot salad, cold bowl, hot bowl, burrito, sandwich); ingredient options for the food product type; processing requirements for the food product type; a deployment specification for the skid assembly 102 (e.g., on a truck, in a cargo van, in a kiosk); and power availability for the designated deployment; etc. for the skid assembly 102. The technician may then install these food dispensing, processing, and infrastructure modules into corresponding slots on a skid no, as shown in FIG. 1.

To (re)configure a skid assembly 102, the technician may load empty food dispensing modules 120 designated for frozen foods onto the skid and load frozen ingredients into food dispensing modules 120 on the skid 110 to prevent thawing of frozen foods. Alternatively, the technician may load dried goods into food dispensing modules 120 before loading these modules onto the skid 110.

For example, the technician may install food dispensing modules 120 along the food-handling side of the skid 110 based on designated temperatures of ingredients contained in these food dispensing modules 120, such as by: grouping food dispensing modules 120 loaded with food designated for freezing; grouping food dispensing modules 120 loaded with ingredients designated for refrigeration; grouping food dispensing modules 120 loaded with ingredients requiring no persistent temperature control (e.g., salt, spices); and grouping food dispensing modules 120 loaded with ingredients designated for heating or cooking. The technician can also install an upstream packaging module ahead of these food dispensing modules 120, a food processing module 140 behind these food dispensing modules 120, install a downstream packaging module behind the food processing module 140, and install a handoff module behind the downstream packaging module to handoff complete food product units to patrons. The technician may similarly load infrastructure modules into slots on the infrastructure side of the skid 110.

The technician may also: assemble a freezer housing around food dispensing modules 120 loaded with ingredients designated for freezing; assemble an insulated housing 134c around food dispensing modules 120 loaded with ingredients designated for freezing; and connect the freezing and insulated housing 134cs to a remote refrigeration module 134 installed on the infrastructure side of the skid 110. The technician may similarly assemble heat shields around modules containing heating elements, arrange fire suppression nozzles to face food dispensing modules 120 and food processing modules 140 containing heating elements and/or electrical subsystems, and assemble a housing 160 over the skid 110, such as if the skid assembly 102 is designated for loading onto a mobile food truck.

8.1 Variation: Controls

In one variation, a remote computer system or the technician also loads a control program—for the combination of food dispensing, processing, and infrastructure modules installed on the skid 110—onto a controller 150 in the skid assembly 102 to enable the controller 150 to fulfill food orders received from patrons by selectively actuating these modules.

In one implementation, the technician selects a predefined control program for the specified combination of modules installed on the skid no and loads the predefined control program onto the controller 150.

In another implementation, the technician: loads a generic control program into a technician portal (e.g., executing on the technician's smartphone, tablet, or desktop computer); selects virtual modules—representing food dispensing modules 120 and food processing modules 140 installed on the skid no—from a menu or dropdown list presented in the technician portal; drops these virtual modules onto position over a virtual representation of the skid no—rendered within the technician module—corresponding to (approximate) real positions of these food dispensing modules 120 and food processing modules 140 in the skid assembly 102; specifies ingredients loaded into each of these food dispensing modules 120; and indicates a food type that the skid 110 is thus configured to assemble, such as by selecting this food type from a dropdown menu including smoothies, cold bowls, hot bowls, sandwiches, etc. The technician portal (or a remote computer system) can then: automatically generate a menu for this skid 110 based on these inputs from the technician; compile a control program for the skid assembly 102; and load this control program onto the skid assembly 102.

In yet another implementation, the controller 150 in the skid 110 reads identifiers from food dispensing, processing, and infrastructure modules installed in the skid assembly 102 and automatically configures a control program accordingly.

The technician may then: calibrate the skid 110, as described below; and verify autonomous operation of the skid no to produce units of the food product, such as by triggering the skid assembly 102 to execute a small number of food orders, before dispatching a truck to load and deploy the skid assembly 102. For example, the technician may input an order for a particular smoothie that calls for 3 cups of frozen strawberries and 1 cup of coffee. The technician can check that the system 100 outputs a smoothie with the correct ingredients (e.g., 3 cups of frozen strawberries and 1 cup of coffee). In response to receiving a smoothie with blueberries instead of strawberries, the technician can check that modules have been loaded correctly, and/or troubleshoot the system 100 until the correct smoothie recipe is generated.

However, a technician, a remote computer system, and/or a controller 150 in a skid 10 can implement any other method or technique to configure a control program for controlling food dispensing, processing, and infrastructure modules installed in the skid assembly 102 to produce units of a food product responsive to food orders from patrons.

8.2 Variation: Module Calibration

In one variation, a skid assembly 102 is calibrated after (re)configuration with a set of food dispensing, processing, and infrastructure modules and before the skid assembly 102 is (re)deployed.

In one implementation, each food dispensing module 120 includes an optical sensor (e.g., a e.g., photodiode, a line-scan camera, a 2D camera) integrated into and facing downward from the food dispensing module 120, such as at known lateral and longitudinal offset distance from the centers of its ingredient output. In this implementation, an optical fiducial is integrated into the conveyor 180, such as: an active optical fiducial in the form of a single-point optical emitter (e.g., an infrared LED) arranged at one longitudinal position on the conveyor 180; or a linear optical emitter (e.g., a linear infrared LED array) arranged laterally across the conveyor 180 at one longitudinal position on the conveyor 180. The optical sensor integrated into a food dispensing module 120 can thus detect the optical fiducial when the segment of the conveyor 180 containing this optical fiducial is located (substantially directly) below the optical sensor as the conveyor 180 advances the optical fiducial forward during a calibration routine. Alternatively, in this implementation, a discrete calibration unit containing an optical emitter—detectable by optical sensors in the food dispensing modules 120—can be temporarily placed on the conveyor 180 during a calibration routine.

In one implementation, a passive fiducial—such as in the form of a QR code or barcode—is temporarily or permanently arranged on the conveyor 180; and optical sensors (e.g., line-scan cameras, 2D camera) integrated into food dispensing modules 120 installed in the skid assembly 102 can thus detect this optical fiducial when the segment of the conveyor 180 containing this optical fiducial is located (substantially directly) below these optical sensors as the conveyor 180 advances the passive fiducial forward during a calibration routine.

Thus, once a skid assembly 102 is (re)configured with a set of food dispensing and processing modules 140, the skid assembly 102 can execute a calibration routine automatically. For example, during a calibration routine, the controller 150 can: activate the optical emitter in the conveyor 180; trigger the conveyor 180 to advance forward; sample outputs of optical sensors in the food dispensing modules 120; detect the optical fiducial in fields of view of these optical sensors; store positions of the conveyor 180 that correspond to longitudinal alignment of the optical fiducial with optical sensors in these food dispensing modules 120; (correct these conveyor positions based on a known longitudinal offset between an optical sensor and a center of a module for each of these modules;) and interpret absolute and relative positions of these food dispensing modules 120 in the skid assembly 102 accordingly.

In a similar implementation, each food dispensing module 120 includes an active or passive optical fiducial located on these modules. During a calibration routine, an optical sensor is temporarily placed on the conveyor 180 proximal a first food dispensing module 120. The controller 150 then: triggers the conveyor 180 to advance forward thereby moving the optical sensor under each food dispensing module 120; samples the optical sensor; detects these optical fiducials in the field of view of the optical sensor while tracking the location of the conveyor 180; and records relative and absolute positions of each food dispensing module 120 in the skid assembly 102 based on positions of the conveyor 180 at which these optical fiducials were detected in the field of view of the optical sensor. In this implementation, optical fiducials located on these modules can be unique, and the controller 150 can thus identify or confirm unique modules and/or module types loaded into the skid assembly 102 based on these optical fiducials and (re)configure a control program for the skid assembly 102 accordingly, such as described above.

In yet another implementation, to complete (re)configuration of a skid assembly 102, a technician can: locate a reference marker (e.g., a cup, a plate, and paperweight) on a first end of the conveyor 180; trigger the controller 150 to advance the conveyor 180; trigger the controller 150 to halt the conveyor 180 with the reference marker under an output of a first food dispensing module 120; trigger the controller 150 to store the current conveyor position as a center location of the first module; and then repeat this process for each other food dispensing module 120 installed in the skid assembly 102.

The controller 150 can implement similar methods and techniques to detect and store locations of food processing modules 140 and other modules installed on the food-handling side of the skid no. The controller 150 can then time actuation of these food dispensing and processing modules 140 in the skid assembly 102 during fulfillment of a food order based on absolute and/or relative positions of these modules.

In one variation, once the skid assembly 102 has completed reconfiguration, the system 100 can—via the controller 150—trigger the set of food dispensing modules 120 to dispense a first proportion of ingredients to test that each food dispensing module 120 dispenses the first proportion. Additionally and/or alternatively, the controller 150 can trigger the set of food dispensing modules 120 to generate a test food order to check that the ingredients dispensed and quantities of ingredients dispensed match the test food order.

8.3 Module Cleaning and Reloading

In one variation, when a skid assembly 102 is returned to the warehouse following deployment, the technician may: remove food dispensing, processing, and infrastructure modules from the skid 110; load the food dispensing and processing modules 140 onto a rack for cleaning; load the infrastructure modules onto a rack for servicing as needed; and release cleaned, empty food dispensing modules 120 to an external supplier for reloading with specified ingredients. For example, a truck loaded with a first skid assembly 102 configured to serve smoothies can return to the warehouse after deployment at a park. After unloading of the first skid assembly 102 from the truck, the modules can be removed from the skid 110 and loaded onto a rack for cleaning and servicing as needed. After removing the modules, the skid 110 can be cleaned including emptying waste containers and servicing fixed infrastructure 170 (e.g., the compressor unit) installed on the skid 110. Once the skid 110 is cleaned, the skid 110 can be reloaded with clean modules to assemble a second skid assembly 102 configured to serve salads. The second skid assembly 102 can then be loaded onto the truck which can then be redeployed to the park or a different location to serve salads.

Alternatively, the skid assembly 102 can be removed from the truck and a second skid assembly 102—preloaded with a set of clean and loaded modules—can be immediately loaded onto the truck in preparation for deployment. For example, upon returning on a truck to the warehouse from deployment at a park during breakfast, a first skid assembly 102—including a first skid 110 loaded with a first set of modules—configured for serving smoothies loaded in a cargo van can be removed from the cargo van and disassembled for cleaning and preparation for redeployment. Once the first skid 110 is removed from the cargo van, a second skid 110—preloaded with a second set of modules configured for serving hot bowls—can immediately be loaded into the cargo van for deployment to a business plaza for lunch. Later, when the cargo van returns from the business plaza after lunch, the second skid 110 can be removed from the cargo van and the first skid 110—now loaded with a third set of modules configured for serving salads—can be loaded into the cargo van while the second skid 110 is cleaned. Therefore, by preloading skids no with modules and corresponding ingredients and implementing multiple skids no in different configurations, skids no can be seamlessly unloaded and loaded for deployment such that downtime is limited and efficiency is increased. Further, by assembling skids no operable in multiple configurations, the quantity of skids 110 necessary for continuous operation is minimal.

In one variation, before redeployment of the skid assembly 102, once a set of modules is assembled on the skid assembly 102, the system 100 can initiate a purge of the system 100 to ensure that all lines (e.g., food lines and beverage lines) are filled only with designated ingredients. For example, once a new set of modules has been assembled on a skid no, the system 100 can initiate—via the controller 150—a purge of the set of food dispensing modules 120 including continuous dispensation of each ingredient for a set duration of time (e.g., 1 minute, 10 minutes) to: check that only a target ingredient is dispensed; check that the rate of dispensation is constant and/or matched to an expected rate; ensure food dispensing lines are purged of any trace of previously loaded ingredients.

8.4 Variation: Non-Linear Module Rack

In one variation, dispensing and processing modules 140 are arranged non-linearly within a skid assembly 102. For example, a skid assembly 102 can be assembled with food dispensing and processing modules 140 located around a circular rack; and a robotic system (e.g., rather than a conveyor 180) can be arranged near the center of this circular rack, configured to move a food product unit between these food dispensing and processing modules 140 to complete the food product unit, and configured to place a completed food product unit on a handoff module that serves the food product unit to a patron.

In another example, food dispensing and processing modules 140 are stacked to form a multi-level skid assembly 102, such as defining a smaller footprint or configured to store and dispense a greater number of ingredients over the same footprint at the skid assembly 102 described above.

However, dispensing, processing, and infrastructure modules can be arranged in any other way on a skid 110 to form a skid assembly 102 configured to fulfill food orders received from local or remote patrons.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A modular system for autonomous food assembly comprises:
   a skid:
      operable in a first configuration to support a first set of modules; and
      operable in a second configuration to support a second set of modules;
   a set of food dispensing modules, each food dispensing module configured to:
      transiently install on the skid;
      store ingredients; and
      dispense servings of ingredients;
   a set of food processing modules each food processing modules configured to:
      transiently install on the skid;
      process servings of ingredients received from the set of food dispensing modules to produce food units matched to a set of food orders;
   a set of power modules configured to:
      transiently install on the skid, each power module, in the set of power modules, including a power source unique to the set of food dispensing modules; and
      distribute power from the power source to the set of food dispensing modules; and
   a controller installed on the skid and configured to:
      receive the set of food orders; and
      selectively control the set of food dispensing modules, according to the set of food orders, to prepare food units for dispensation.

2. The modular system of claim 1:
   wherein the first configuration defines the first set of modules comprising:
      a first subset of food dispensing modules in the set of food dispensing modules;
      a first subset of food processing modules in the set of food processing modules;
      a first subset of power modules in the set of power modules; and
   wherein the second configuration defines the second set of modules comprising:
      a second subset of food dispensing modules in the set of food dispensing modules;
      a second subset of food processing modules in the set of food processing modules; and
      second subset of power modules in the set of power modules.

3. The modular system of claim 2:
   wherein the first subset of power modules comprises a generator, a fuel cell, and a set of batteries;
   wherein the skid in the first configuration comprising the first subset of power modules is configured for deployment to a first location lacking grid power supply;
   wherein the second subset of power modules comprises a power inverter; and
   wherein the skid in the second configuration comprising the second subset of power modules is configured for deployment to a second location and to couple with grid power supply.

4. The modular system of claim 1:
further comprising:
- a refrigeration module installed on the skid;
- a first housing configured to enclose a first subset of food dispensing modules, in the set of food dispensing modules, loaded with ingredients designated for freezing;
- a second housing configured to enclose a second subset of food dispensing modules, in the set of food dispensing modules, loaded with ingredients designated for refrigeration; and
- a third housing configured to enclose a third subset of food dispensing modules, in the set of food dispensing modules, loaded with ingredients designated for room temperature storage; and
- wherein the refrigeration module is configured to couple to the first housing and the second housing.

5. The modular system of claim 4:
wherein the first subset of food dispensing modules, in the set of food dispensing modules, comprises food dispensing modules loaded with frozen fruit for blending in smoothies;
wherein the second subset of food dispensing modules, in the set of food dispensing modules, comprises food dispensing modules loaded with vegetables for mixing in salads; and
wherein the third subset of food dispensing modules, in the set of food dispensing modules, comprises food dispensing modules loaded with spices for flavoring foods.

6. The modular system of claim 1:
wherein the skid operable in the first configuration is configured to transiently install in a road vehicle; and
wherein the skid operable in the second configuration is configured to transiently install on a fixed kiosk.

7. The modular system of claim 1, wherein the skid is:
at a first time, in the first configuration and configured to deploy on a bed of a truck, the first configuration to support a first subset of food dispensing modules, in the set of food dispensing modules, and configured to make smoothies according to the set of food orders;
at a second time succeeding the first time, in a third configuration configured to be cleaned at a warehouse, the set of food dispensing modules and the set of food processing modules removed from the skid in the third configuration; and
at a third time succeeding the second time, in the second configuration and configured to serve food at a fixed kiosk, the second configuration to support a second subset of food dispensing modules, in the set of food dispensing modules, and configured to make salads according to the set of food orders.

* * * * *